(No Model.)
G. BEEKMAN.
PROPELLING AND BRAKING MECHANISM FOR CYCLES.
No. 592,231. Patented Oct. 26, 1897.
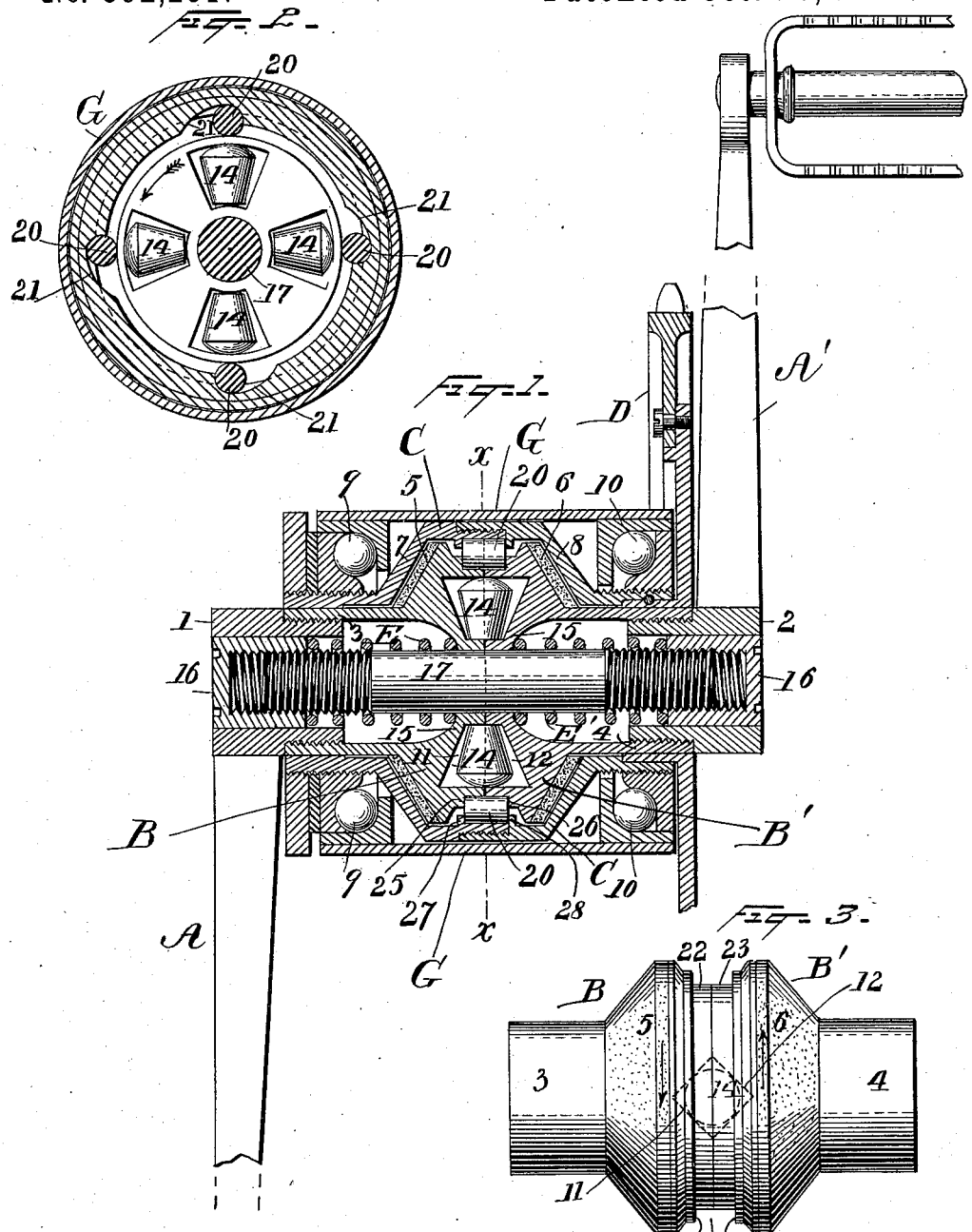
WITNESSES:
Norris H. Clark
Eugene Lucas
INVENTOR
Gerard Beekman,
BY
Henry F. Parks,
ATTORNEY

UNITED STATES PATENT OFFICE.

GERARD BEEKMAN, OF NEW YORK, N. Y.

PROPELLING AND BRAKING MECHANISM FOR CYCLES.

SPECIFICATION forming part of Letters Patent No. 592,231, dated October 26, 1897.

Application filed April 15, 1897. Serial No. 632,282. (No model.)

*To all whom it may concern:*

Be it known that I, GERARD BEEKMAN, a citizen of the United States, and a resident of New York, in the county of New York and State of New York, have invented certain new and useful Improvements in Propelling and Braking Mechanism for Cycles, of which the following is a specification.

My invention relates to improvements in bicycle propelling and braking mechanism operated by simultaneous depression of two opposite rotary pedal-cranks within the principle embodied in my device made the subject of Letters Patent No. 550,938, dated December 10, 1895, the rotary motion of the cranks being imparted to the sprocket-wheel or other driven element by frictional engagement determined by foot-pressure. A clutch action is produced intermittently by the pressure or impulses of the rider's feet upon the pedals, and forward or backward propulsion, or braking, or coasting may each be effected according to the manner of moving or arresting the pedal-cranks and without requiring the feet to be removed from them. By a reduction or release of foot-pressure the pedals may remain stationary or be revolved at a slower speed than the revolution of the sprocket-wheel or driven element and the propelling impulses may be administered at such intervals as desired, therefore permitting the rider to rest or dwell between impulses at will, and he may thereby use a comparatively "low gear," giving advantage in hill-climbing, while not imposing a continuous and tedious rapidity of revolution of the cranks when speeding on a level or descending road.

My invention especially relates to improvements in mechanism such as shown and described in my separate patent application, Serial No. 626,040, filed March 5, 1897, wherein a clutch is used having its engaging and disengaging movements in the length of the crank-shaft or axis and having such movements imparted by foot-pressure through the agency of cam formations which contract the crank-hubs toward one another and bind the clutch-surfaces.

The object of my present invention is to arrange and concentrate the clutch mechanism within the crank-shaft hanger of the bicycle-frame in such manner as to improve the external appearance of the device, exclude dust, and secure compactness and axial rigidity and other advantages; and my said invention consists in certain novel arrangement and combinations of parts, as are hereinafter described and claimed, the hubs of the cranks being expanded apart on the axis by cam formations when subjected to foot-pressure to engage the clutch.

Referring to the drawings, Figure 1 represents a cross-section in the frame of a bicycle, taken in the length of the crank-shaft hanger and showing the internal construction of the parts. Fig. 2 is a vertical section taken at $x\ x$, Fig. 1. Fig. 3 is a detail view of the crank-shaft in side elevation.

The cranks A A' have their hubs 1 2 securely fixed into the extremities 3 4 of the shaft-sections B B', respectively, and both said sections revolve together except for a slight yielding motion rotatively with respect to one another, which is converted into longitudinal motion limited by the contact of the rawhide faces 5 6 of said sections with the rigidly-coupled concave clutch portions 7 8, respectively, of the driven element or hub C of the sprocket-wheel D.

The part C is mounted in ball-bearings 9 10, and the crank-shaft B B' is journaled at its extremities 3 4 in the extremities of the said hub C. When the cranks A A' are propelling, the parts B B' revolve with the part C, and the ball-bearings 9 10 therefore serve for the crank-shaft B B'.

The slight rotative movement of the shaft-sections B B' with respect to one another (in response to the simultaneous depression of the pedals of the opposite cranks A A') is converted into a longitudinal movement by the action of the cam formations or V-shaped recesses 11 12 upon the interposed frusto-conic rollers 14, and such action is opposed by a spring arrangement consisting of two compression-springs E E', which are confined under pressure between the inner flanges 15 15 of the parts B B' and the adjustable nuts 16 16 at the extremities of the screw-threaded tie-rod 17. These springs may be adjusted with sufficient force to resist the weight of the rider's legs on the pedals, it being intended that the frictional clutch device shall engage only when depression is effected by muscular effort.

In addition to the friction clutch device 5 7 and 6 8, I prefer to also employ a positive clutch for forward propulsion, consisting of rollers 20, arranged in inclined pockets 21 in the driven shaft or hollow hub of the sprocket-wheel D, said rollers engaging without lost motion on either surface 22 or 23 of the channel F when the crank A or A' is forwardly propelled. The parts B B' are lengthwise supported at a central position in the part C, and checked against undue endwise movement by the abutment of the ends of the rollers 20 between the shoulders 25 26, Figs. 1 and 3, and between the shoulders 27 28, Fig. 1.

In the operation of the device the driving element, consisting of parts A B A' B', is normally disengaged rotatively from the driven element C D. In order to start the bicycle forwardly, foot-pressure is applied to the pedal of the forwardmost crank and the roller-clutch 20 at once engages with the sprocket-wheel hub or shaft C and drives the machine. When headway is obtained, the rider may relax his foot effort at pleasure between strokes, administering a thrust as occasion requires, and thereby avoid continuous rapid motion of the feet when running at high speed on level roads, or under other conditions requiring moderate effort to keep the machine in motion at the desired speed. In order to coast or allow the bicycle to run for a distance by its momentum, the pedals may be brought to rest, the shaft B B' remaining idle within the revolving hollow shaft or hub C and the springs E E' supporting the weight of the legs through the agency of the cam devices described, affording a comfortable foot-rest without necessitating the removal of the feet from the pedals. Whenever it is desired to moderate or check the speed of the wheel, a gentle muscular pressure may be administered to the pedals simultaneously, rotating the cranks A A' and their respective shaft-sections B B' in opposite directions to the slight extent limited by the impingement of the clutch-surfaces 5 7 and 6 8, applying the desired degree of frictional retardation of the revolving part C. An emergency stop may be effected in like manner by a vigorous depression of the pedals. Back-pedaling may be performed by simultaneously depressing both pedals and applying the excess of pressure to the rear pedal, and in a similar manner the machine may be propelled backward when so desired for exhibition purposes, &c. In other words, entire control and management of the machine are obtained by the action of the feet on the pedals, as above described.

The entire mechanism thus described is concentrated within the crank-shaft hanger G, preserving the conventional form and external appearance of the bicycle-frame.

Having thus fully described my invention, what I claim, and desire to secure by Letters Patent, is—

1. In a cycle, the combination with a crank-shaft-hanger box having ball-bearings at each extremity, of a driven shaft rotative in said bearings and carrying a sprocket-wheel or other motion-transmitting device located beyond the extremity of the hanger-box, and two cranks immediately outside the extremities of the driven shaft and having a limited rotative movement with relation to each other, clutch mechanism located between said ball-bearings and inclosed within said hanger-box, and means whereby said clutch mechanism is engaged and disengaged with the driven shaft by the said relative movement of the cranks to communicate motion from the driving to the driven shaft.

2. In a cycle, the combination with a crank-hanger and a rotary tubular driven shaft therein, of two oppositely-disposed pedal-cranks mounted upon shaft-sections extending within the tubular shaft and having a limited rotative and longitudinal movement relative to each other, mechanism for converting the opposed rotative movement of said shaft-sections in either relative direction from a normal intermediate position into an opposed longitudinal movement thereof in one given direction located between the adjacent inner ends of said shaft-sections, tapered frictional contact-surfaces upon said shaft-sections caused to engage with tapered frictional contact-surfaces within said driven shaft by said opposed longitudinal movement of the sections, and springs and means for confining them with inward longitudinal pressure against said shaft-sections.

3. In a cycle, the combination with a crank-hanger and a rotary tubular driven shaft therein, of two oppositely-disposed pedal-cranks mounted upon shaft-sections extending within the tubular shaft and having a limited rotative and longitudinal movement relative to each other, mechanism for converting the opposed rotative movement of said shaft-sections in either relative direction from a normal intermediate position into an opposed longitudinal movement thereof in one given direction located between the adjacent ends of said shaft-sections, tapered frictional contact-surfaces upon said shaft-sections caused to engage with tapered frictional contact-surfaces within said driven shaft by said opposed longitudinal movement of the sections, and springs and means for confining them with inward longitudinal pressure against said shaft-sections, and a positive clutch mechanism consisting in rollers located in inclined pockets and interposed between said sections and said driven shaft adapted to engage for a given direction of rotation.

Signed at New York, in the county of New York and State of New York, this 13th day of April, A. D. 1897.

GERARD BEEKMAN.

Witnesses:
CHARLES E. FRANCIS,
EUGENE LUCAS.